(12) United States Patent
Matsumoto (10) Patent No.: US 7,649,964 B2
(45) Date of Patent: Jan. 19, 2010

(54) RADIO RECEIVER AND NOISE ESTIMATED VALUE CORRECTION METHOD

(75) Inventor: Mariko Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 539 days.

(21) Appl. No.: 11/627,396

(22) Filed: Jan. 26, 2007

(65) Prior Publication Data

US 2007/0183537 A1      Aug. 9, 2007

(30) Foreign Application Priority Data

Feb. 8, 2006      (JP)      ............................... 2006-030743

(51) Int. Cl.
*H03D 1/04*      (2006.01)
*H04L 1/00*      (2006.01)
(52) U.S. Cl. ...................... 375/340; 375/346
(58) Field of Classification Search ................ 375/147, 375/260, 262, 316, 340, 346, 350
See application file for complete search history.

(56) References Cited

U.S. PATENT DOCUMENTS

| | | | | |
|---|---|---|---|---|
| 6,052,420 | A * | 4/2000 | Yeap et al. ................... | 375/346 |
| 7,170,961 | B2 * | 1/2007 | Vandenameele-Lepla ... | 375/371 |
| 7,349,483 | B2 * | 3/2008 | Seki et al. ................... | 375/260 |
| 7,397,842 | B2 * | 7/2008 | Bottomley et al. .......... | 375/148 |
| 2002/0003833 | A1 * | 1/2002 | Usuda et al. ................ | 375/144 |

FOREIGN PATENT DOCUMENTS

| | | |
|---|---|---|
| JP | 2000-078111 A | 3/2000 |
| JP | 2004-007793 A | 1/2004 |

OTHER PUBLICATIONS

Kawamura et al., "Comparison Between Multipath Interference Canceller and Chip Equalizer with Other-Cell Interference Suppression in HSDPA in Multipath Channel", Technical Report of IEICE, RCS2002-38, IEICE, pp. 123-128, 2002, Abstract.
Falconer et al., "Frequency Domain Equalization for Single-Carrier Broadband Wireless System", IEEE Communications Magazine, vol. 40, No. 4, pp. 58-66, 2002.
"3GPP TS 25.214 V6.6.0", $3^{rd}$ Generation Partnership Project; Technical Specification Group Radio Access Network; Physical layer procedures (FDD) (Release 6), Chapter 5, pp. 13-30, 2005.

* cited by examiner

*Primary Examiner*—Young T. Tse
(74) *Attorney, Agent, or Firm*—Sughrue Mion, PLLC (57) ABSTRACT

A radio receiver includes a channel estimation unit, phase difference vector generation unit, correction coefficient setting unit, and noise estimation unit. The channel estimation unit obtains a channel estimated value from a received signal at a predetermined period by using a known pilot signal. The phase difference vector generation unit obtains a phase difference vector between the preceding channel estimated value and the current channel estimated value. The correction coefficient setting unit sets a correction coefficient corresponding to the phase difference vector. The noise estimation unit obtains a corrected noise estimated value by correcting a noise estimated value on the basis of the received signal and the correction coefficient. A noise estimated value correction method is also disclosed.

15 Claims, 8 Drawing Sheets

$$H = \begin{bmatrix} h_0 & 0 & 0 & 0 \\ 0 & h_0 & 0 & 0 \\ h_1 & 0 & h_0 & 0 \\ 0 & h_1 & 0 & h_0 \\ h_2 & 0 & h_1 & 0 \\ 0 & h_2 & 0 & h_1 \\ 0 & 0 & h_2 & 0 \\ 0 & 0 & 0 & h_2 \end{bmatrix} \updownarrow \Delta n = (t1-t0)/T_{tap}$$

FIG. 11

$h = [k_0 \ k_1 \ k_2 \ k_3 \ k_4 \ k_5 \ k_6 \ k_7] = [h_0 \ 0 \ h_1 \ 0 \ h_2 \ 0 \ 0 \ 0]$ $\Delta n = (t1-t0)/T_{sampling}$

RADIO RECEIVER AND NOISE ESTIMATED VALUE CORRECTION METHOD

BACKGROUND OF THE INVENTION

The present invention relates to a radio receiver that uses channel estimation in receiving and demodulating a signal under a fading environment and, more particularly, to a radio receiver and noise estimated value correction method of correcting a noise estimated value.

In recent mobile communication, packet data traffic is becoming faster and increasing the capacity. Transportation is also speeding up simultaneously. Hence, when a radio device with a high transmission rate moves at a high speed, fading occurs, resulting in a large degradation in the characteristics.

To reduce the influence of fading, reference 1 (Japanese Patent Laid-Open No. 2004-7793) proposes a demodulation apparatus which obtains a channel estimated value by assigning weights to pilot signals contained in a received signal and averaging them and demodulates the received data by using the channel estimated value in mobile wireless communication such as CDMA (Code Division Multiple Access).

Reference 2 (Japanese Patent Laid-Open No. 2000-78104) proposes a CDMA synchronous detection channel estimation apparatus that accurately estimates a channel by adaptively controlling weighting coefficients in pilot signal averaging.

Reference 3 (Kawamura, Kishiyama, Higuchi, and Sawahashi, "Comparison Between Multipath Interference Canceller and Chip Equalizer with Other-Cell Interference Suppression in HSDPA in Multipath Channel", Technical Report of IEICE, RCS2002-38, IEICE, pp. 123-128, 2002) and reference 4 (D. Falconer et al., "Frequency Domain Equalization for Single-Carrier Broadband Wireless System", IEEE Communications Magazine, Vol. 40, No. 4, pp. 58-66, 2002) propose a method of suppressing characteristic degradation due to multipath fading by using a chip equalizer or frequency equalizer.

Reference 5 ("3G PP TS 25.214 V6.6.0", 3rd Generation Partnership Project; Technical Specification Group Radio Access Network; Physical layer procedures (FDD) (Release 6), Chapter 5, pp. 13-30, 2005) proposes a method of controlling power by using the S/R ratio estimated value of a received signal.

A noise estimated value V calculated by using a channel estimated value is given by $$V = E_{chip} - \frac{Ior}{Ec} \sum_{1}^{L} (h_1)^2 \quad (1)$$

where $E_{chip}$ is the received signal power, $h_1$ is the channel estimated value of the first path, L is the total number of paths, Ec/Ior is the ratio of pilot power Ec to total transmission power Ior.

When a mobile unit moves at a high speed, phase swinging occurs due to fading. If phase swinging occurs upon obtaining a channel estimated value by averaging a plurality of pilot symbols estimated from pilot signals, the received power is underestimated. Hence, the noise estimated value V calculated by using the channel estimated value becomes large, degrading the estimation accuracy of the signal-to-noise ratio (S/N) of the channel estimated value.

As a result, in a radio receiver that uses a noise estimated value and a channel estimated value to equalize a received signal, the equalization characteristic of the equalizer degrades. In a radio receiver that uses a noise estimated value and a channel estimated value for path search, the path assignment characteristic degrades. In a radio receiver that uses a noise estimated value and a channel estimated value to control power, the control characteristic degrades. For example, in a radio receiver including an MMSE equalizer, since a weight value obtained by using a noise estimated value and a channel estimated value is incorrect, the equalization characteristic degrades.

Reference 2 discloses a method of accurately estimating a channel, though no method of correcting a noise estimated value has been implemented yet.

SUMMARY OF THE INVENTION

The present invention has been made to solve the above-described problem, and has as its object to provide a radio receiver and noise estimated value correction method capable of correcting degradation in a noise estimated value under a fading environment.

In order to achieve the above object, according to the present invention, there is provided a radio receiver comprising a channel estimation unit which obtains a channel estimated value from a received signal at a predetermined period by using a known pilot signal, a phase difference vector generation unit which obtains a phase difference vector between a channel estimated value precedingly output from the channel estimation unit and a channel estimated value currently output from the channel estimation unit, a correction coefficient setting unit which sets a correction coefficient corresponding to the phase difference vector output from the phase difference vector generation unit, and a noise estimation unit which obtains a corrected noise estimated value by correcting a noise estimated value on the basis of the received signal and the correction coefficient output from the correction coefficient setting unit and outputs the corrected noise estimated value.

There is also provided a noise estimated value correction method comprising the steps of obtaining a channel estimated value from a received signal at a predetermined period by using a known pilot signal, obtaining a phase difference vector between a precedingly obtained channel estimated value and a currently obtained channel estimated value, setting a correction coefficient corresponding to the phase difference vector, and obtaining a corrected noise estimated value by correcting a noise estimated value on the basis of the received signal and the correction coefficient.

DESCRIPTION OF THE PREFERRED EMBODIMENTS

The embodiments of the present invention will be described below in detail with reference to the accompanying drawings.

First Embodiment

Figure 1:
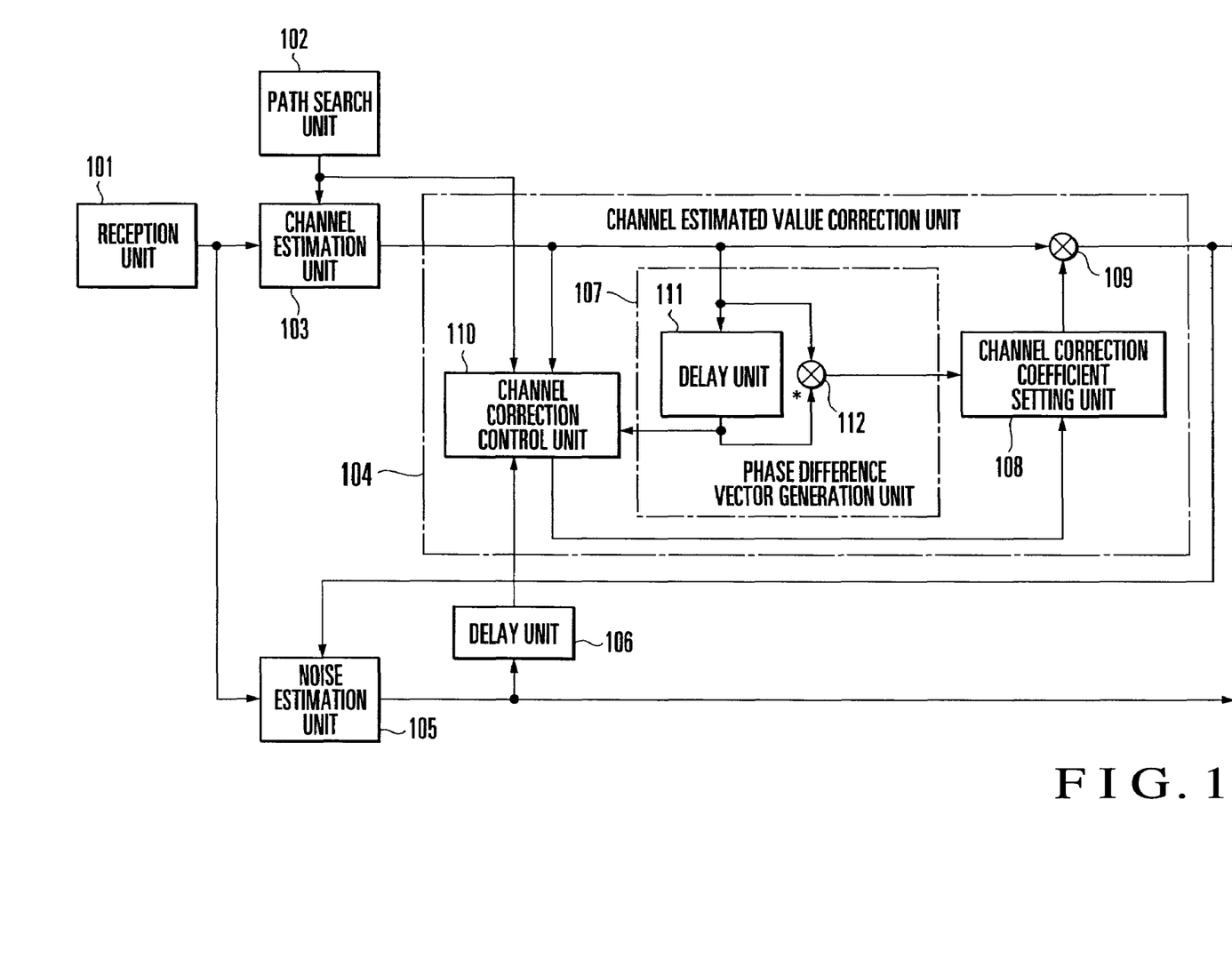
FIG. 1 is a block diagram showing the arrangement of the channel estimated value correction apparatus and noise estimated value correction apparatus of a radio receiver according to the first embodiment of the present invention.

As shown in FIG. 1, the channel estimated value correction apparatus and noise estimated value correction apparatus of a radio receiver according to the first embodiment of the present invention comprise a channel estimation unit 103 which obtains a channel estimated value from a received signal at a predetermined period by using a known pilot signal, a channel estimated value correction unit 104 which corrects the channel estimated value by multiplying it by a channel correction coefficient and outputs the corrected channel estimated value, a noise estimation unit 105 which obtains a corrected noise estimated value by correcting a noise estimated value on the basis of the received signal and the corrected channel estimated value, and a delay unit 106 which delays the corrected noise estimated value from the noise estimation unit 105 by a time corresponding to a predetermined period.

The channel estimated value correction unit 104 comprises a phase difference vector generation unit 107 which outputs a phase difference vector as the product of the complex conjugate of the preceding channel estimated value and the current channel estimated value, a channel correction coefficient setting unit 108 which outputs a channel correction coefficient on the basis of the phase difference vector, a channel correction coefficient multiplication unit 109 which multiplies the channel estimated value by the channel correction coefficient and outputs the corrected channel estimated value, and a channel correction control unit 110 which determines whether the channel correction coefficient is valid. The phase difference vector generation unit 107 comprises a delay unit 111 which delays the channel estimated value by a time corresponding to a predetermined period, and a complex conjugate multiplication unit 112 which multiplies the current channel estimated value by the complex conjugate of the preceding channel estimated value.

The operation of the channel estimated value correction apparatus and noise estimated value correction apparatus according to this embodiment will be described below. The channel estimation unit 103 multiplies a pilot symbol contained in a received signal output from a reception unit 101 by a complex conjugate or despreads the pilot symbol by using a known pilot signal in accordance with path timing information output from a path search unit 102 and updated at a predetermined period and averages the pilot symbols obtained by complex conjugate multiplication or despreading, thereby outputting a channel estimated value at a predetermined period.

Figure 2A:
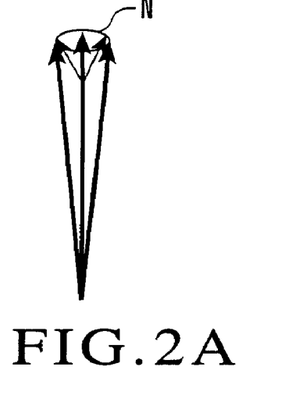
FIGS. 2A and 2B are views for explaining the operation of the channel estimated value correction apparatus and noise estimated value correction apparatus.

FIG. 2A shows pilot symbols when the radio receiver remains at rest or moves at a low speed. The pilot symbols are influenced by noise N. Hence, the influence of noise can be reduced by averaging Nce pilot symbols.

Figure 2B:
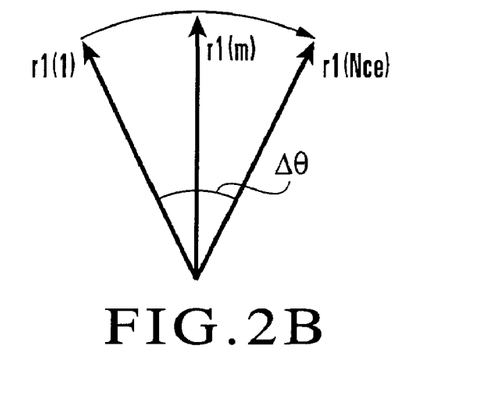

FIG. 2B shows pilot symbols when the radio receiver moves at a high speed. During fast movement, the pilot symbols are influenced by phase swinging that is mainly known as a Doppler frequency fD due to fading. Let r1(m) be the mth pilot symbol of the first path. The 0th to Nceth pilot symbols phase-rotate over time. The pilot symbols phase-rotating as shown in FIG. 2B are averaged in the imaginary part and real part. A channel estimated value $h_1$ of the first path is given by $$h_1 = \frac{1}{Nce}\sum_{m=1}^{Nce} r_1(m)e^{j\omega m} \quad (2)$$

where ω represents the phase swinging of the pilot symbol interval and has a relationship given by $$\Delta\theta = \omega \times Nce \quad (3)$$

Figure 3:
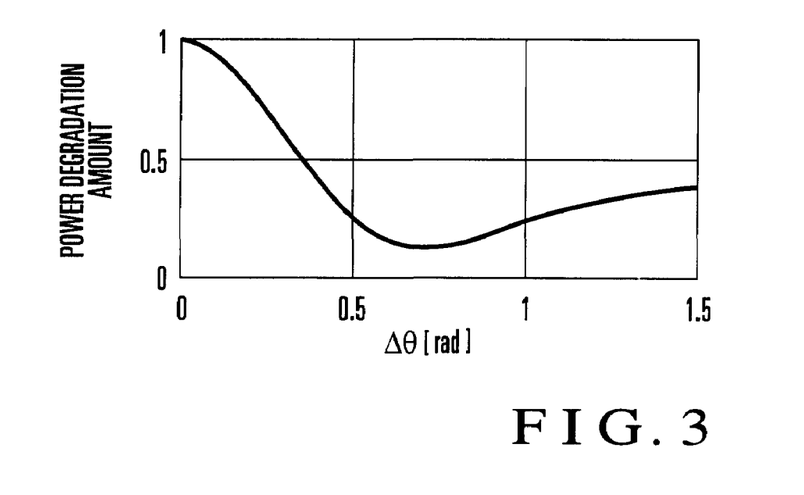
FIG. 3 is a graph showing the relationship between the phase swinging amount of a pilot symbol and the degradation amount of received power.

The relationship between a phase swinging amount Δθ of a pilot symbol and the degradation amount of received power is calculated as in FIG. 3.

On the basis of the channel estimated value output from the channel estimation unit 103, the preceding channel estimated value of one period ago, which is output from the delay unit 111 of the phase difference vector generation unit 107, path timing information output from the path search unit 102, and the preceding corrected noise estimated value output from the noise estimation unit 105 via the delay unit 106, the channel correction control unit 110 of the channel estimated value correction unit 104 determines whether the maximum path timing at which received power is maximized matches the preceding maximum path timing of one period ago. If the maximum path timings do not match, or the magnitude of one of the two, current (current period) and preceding channel estimated values is smaller than a threshold value obtained by multiplying the corrected noise estimated value by a predetermined coefficient, the channel correction control unit 110 outputs an enable/disable signal to invalidate a channel correction coefficient Zc. If the current and preceding maximum path timings match, and the magnitudes of the current and preceding channel estimated values are equal to or larger than the threshold value, the channel correction control unit 110 outputs an enable/disable signal indicating validity of the channel correction coefficient Zc.

The phase difference vector generation unit 107 causes the complex conjugate multiplication unit 112 to multiply the current channel estimated value by the complex conjugate of the preceding channel estimated value passed through the delay unit 111 and outputs the product as a phase difference vector.

When the enable/disable signal output from the channel correction control unit 110 indicates invalidity of the channel correction coefficient Zc, the channel correction coefficient setting unit 108 invalidates channel estimated value correction (i.e., outputs "1" as the channel correction coefficient Zc). When the enable/disable signal output from the channel correction control unit 110 indicates validity of the channel correction coefficient Zc, the channel correction coefficient setting unit 108 selects, on the basis of the phase difference vector, the channel correction coefficient Zc from values stored in advance or calculates the channel correction coefficient Zc on the basis of the phase difference vector and outputs the channel correction coefficient Zc.

Figure 4:
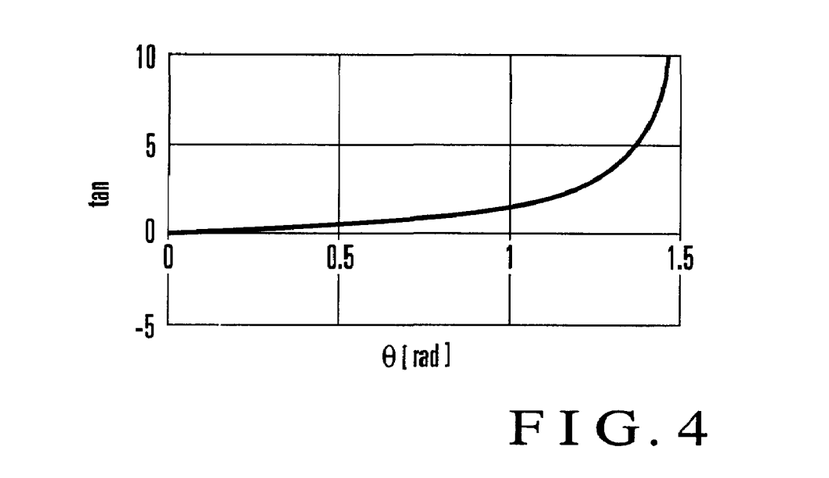
FIG. 4 is a graph showing the relationship between a phase and a tangent value.

The phase difference vector output from the phase difference vector generation unit 107 has the angle $\Delta\theta$ shown in FIG. 2B and equation (3). The channel correction coefficient setting unit 108 stores the relationship between the pilot symbol phase swinging amount $\Delta\theta$ and the power degradation amount as shown in FIG. 3 which is calculated in advance and also the relationship between a phase $\theta$ and a tangent value (tan) as shown in FIG. 4 which is calculated in advance. The channel correction coefficient setting unit 108 calculates the tangent value of the phase difference vector, obtains the angle (phase) $\theta$ of the phase difference vector on the basis of the relationship shown in FIG. 4, and obtains the power degradation amount on the basis of the relationship shown in FIG. 3 by defining the phase swinging amount $\Delta\theta=\theta$. The channel correction coefficient Zc is the reciprocal of the power degradation amount. Hence, the channel correction coefficient Zc can be obtained from the power degradation amount. Actually, it is possible to reduce the calculation by holding the root of the reciprocal of the power degradation amount as a table. Instead of using the relationship in FIG. 3, the channel correction coefficient setting unit 108 may calculate the channel correction coefficient Zc from $$Zc = \frac{1}{\left|\frac{1}{Nce}\sum_{m=1}^{Nce} e^{j\omega_n m}\right|} \quad (4)$$

The channel correction coefficient multiplication unit 109 multiplies the channel estimated value output from the channel estimation unit 103 by the channel correction coefficient Zc output from the channel correction coefficient setting unit 108 and outputs the product as a corrected channel estimated value. If the maximum path timing does not match the preceding maximum path timing, the channel correction control unit 110 searches for a path having a large power value in both the preceding and current maximum path timings and uses paths other than the maximum path to generate the phase difference vector.

The noise estimation unit 105 obtains a noise estimated value (noise power) from the received signal output from the reception unit 101 and the preceding corrected channel estimated value output from the channel estimated value correction unit 104 one period ago. The corrected channel estimated value is obtained by correcting the channel estimated value by the channel correction coefficient Zc. It is therefore possible to correct the noise estimated value by using the corrected channel estimated value to calculate the noise estimated value. A noise estimated value V before correction is calculated by, e.g., equation (1). Let V' be the noise estimated value after correction (corrected noise estimated value). The corrected noise estimated value V' is given by $$V' = E_{chip} - Zc\frac{Ior}{Ec}\sum_{l}^{L}(h_l)^2 \quad (5)$$

which is obtained by substituting the channel correction coefficient Zc into equation (1).

As described above, according to this embodiment, the phase difference vector between the preceding channel estimated value and the current channel estimated value is obtained. A channel correction coefficient corresponding to the phase difference vector is set. The channel estimated value is corrected by multiplying it by the channel correction coefficient. The noise estimated value is corrected by using the corrected channel estimated value. This allows to correct degradation in the noise estimated value under the fading environment upon high-speed movement of the radio receiver by using a simple arrangement. In this embodiment, the channel correction coefficient is selected from values mapped in advance. That is, the channel correction coefficient can be set by calculation in a small amount without using a trigonometric function on the basis of the complex conjugate and the result of multiplication and I. Q division (tan). This prevents degradation in the noise estimated value by calculation in a small amount. Especially when the radio receiver is a mobile station, reduction of the calculation amount is important because reduction of power consumption is important.

Second Embodiment

The second embodiment of the present invention will be described next.

Figure 5:
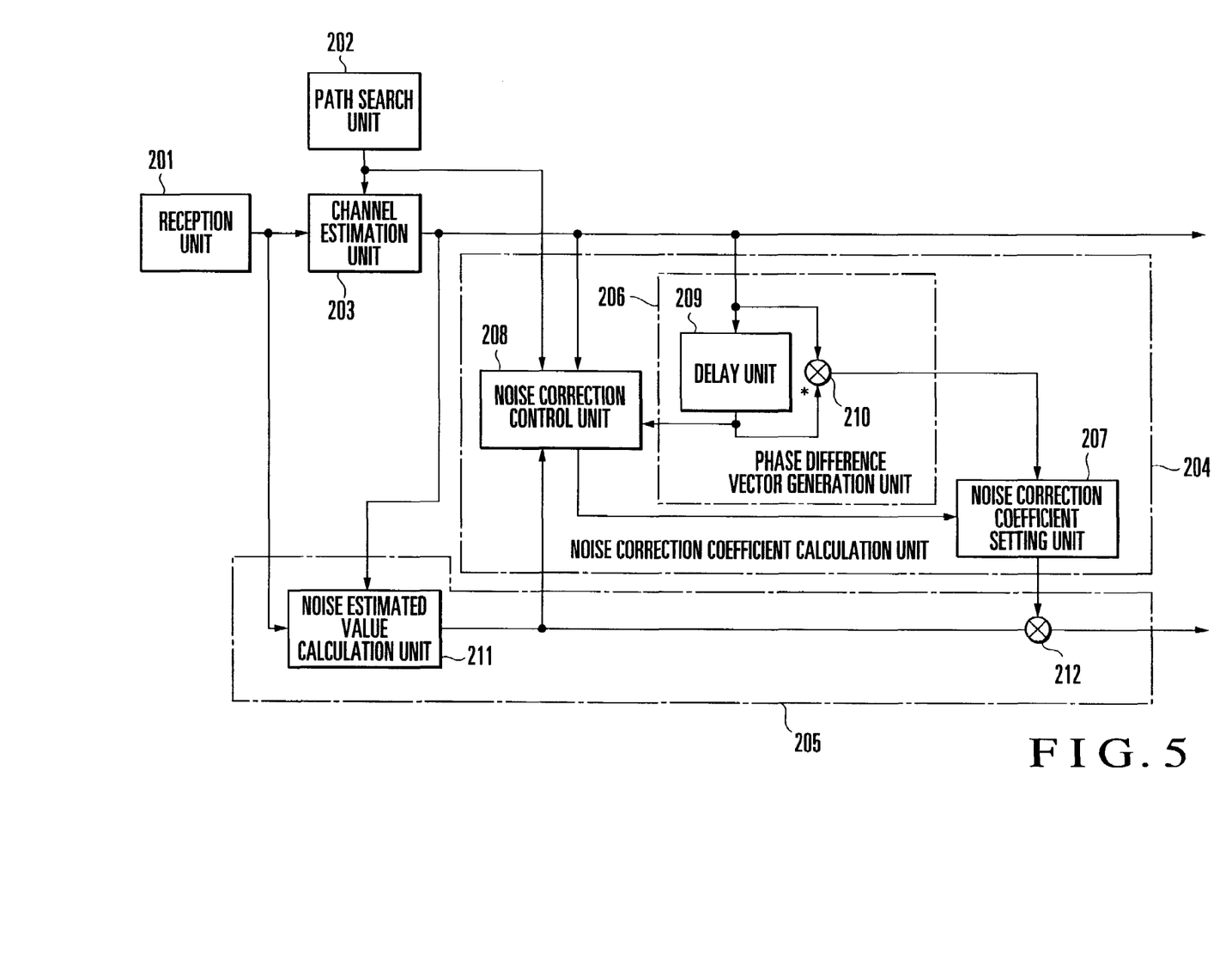
FIG. 5 is a block diagram showing the arrangement of the noise estimated value correction apparatus of a radio receiver according to the second embodiment of the present invention.

As shown in FIG. 5, the noise estimated value correction apparatus of a radio receiver according to the second embodiment of the present invention comprises a channel estimation unit 203 which obtains a channel estimated value from a received signal at a predetermined period by using a known pilot signal, a noise correction coefficient calculation unit 204 which obtains a noise correction coefficient from the channel estimated value, and a noise estimation unit 205 which obtains a corrected noise estimated value by correcting a noise estimated value on the basis of the received signal, channel estimated value, and noise correction coefficient.

The noise correction coefficient calculation unit 204 comprises a phase difference vector generation unit 206 which outputs a phase difference vector as the product of the complex conjugate of the preceding channel estimated value and the current channel estimated value, a noise correction coefficient setting unit 207 which outputs a noise correction coefficient on the basis of the phase difference vector, and a noise correction control unit 208 which determines whether the noise correction coefficient is valid. The phase difference vector generation unit 206 comprises a delay unit 209 which delays the channel estimated value by a time corresponding to a predetermined period, and a complex conjugate multiplication unit 210 which multiplies the current channel estimated value by the complex conjugate of the preceding channel estimated value. The noise estimation unit 205 comprises a noise estimated value calculation unit 211 which obtains the noise estimated value from the received signal and channel estimated value, and a noise correction coefficient multiplication unit 212 which multiplies the noise estimated value by the noise correction coefficient and outputs the corrected noise estimated value.

The operation of the noise estimated value correction apparatus according to this embodiment will be described below. Like the channel estimation unit 103 of the first embodiment, the channel estimation unit 203 multiplies a pilot symbol contained in a received signal output from a reception unit 201 by a complex conjugate or despreads the pilot symbol by using a known pilot signal in accordance with path timing information output from a path search unit 202 and updated at a predetermined period and averages the pilot symbols obtained by complex conjugate multiplication or despreading, thereby outputting a channel estimated value at a predetermined period.

On the basis of the channel estimated value output from the channel estimation unit 203, the preceding channel estimated value of one period ago, which is output from the delay unit 209 of the phase difference vector generation unit 206, path timing information output from the path search unit 202, and a noise estimated value V output from the noise estimated value calculation unit 211 of the noise estimation unit 205, the noise correction control unit 208 of the noise correction coefficient calculation unit 204 determines whether the maximum path timing matches the preceding maximum path timing. If the maximum path timings do not match, or the magnitude of one of the current (current period) and preceding channel estimated values is smaller than a threshold value obtained by multiplying the noise estimated value by a predetermined coefficient, the noise correction control unit 208 outputs an enable/disable signal to invalidate a noise correction coefficient Zn. If the current and preceding maximum path timings match, and the magnitudes of the current and preceding channel estimated values are equal to or larger than the threshold value, the noise correction control unit 208 outputs an enable/disable signal indicating validity of the noise correction coefficient Zn.

The phase difference vector generation unit 206 causes the complex conjugate multiplication unit 210 to multiply the current channel estimated value by the complex conjugate of the preceding channel estimated value passed through the delay unit 209 and outputs the product as a phase difference vector.

When the enable/disable signal output from the noise correction control unit 208 indicates invalidity of the noise correction coefficient Zn, the noise correction coefficient setting unit 207 invalidates noise estimated value correction (i.e., outputs "1" as the noise correction coefficient Zn). When the enable/disable signal indicates validity, the noise correction coefficient setting unit 207 selects, on the basis of the phase difference vector, the noise correction coefficient Zn from values stored in advance or calculates the noise correction coefficient Zn on the basis of the phase difference vector and outputs the noise correction coefficient Zn.

Assume that the target is the signal-to-noise ratio or signal-to-noise interference power ratio, and Zc~1. In this case, equation (5) is rewritten to $$V' = \frac{1}{Zc}\left(E_{chip} - Zc\frac{Ior}{Ec}\sum^{L}(h_1)^2\right) \quad (6)$$

$$= \frac{1}{Zc}\left(E_{chip} - \frac{Ior}{Ec}\sum^{L}(h_1)^2\right) + \left(\frac{1}{Zc} - 1\right)\frac{Ior}{Ec}\sum^{L}(h_1)^2$$

$$\cong \frac{1}{Zc}V$$

Hence, the noise correction coefficient Zn can be set in the following way. As described in the first embodiment, the channel correction coefficient Zc can be obtained on the basis of the phase difference vector. The noise correction coefficient Zn can be obtained from the complex conjugate on the basis of $$Zn \cong \frac{1}{Zc} \quad (7)$$

The noise estimated value calculation unit 211 of the noise estimation unit 205 obtains the noise estimated value V from the received signal output from the reception unit 201 and the channel estimated value output from the channel estimation unit 203. The noise estimated value V is calculated by, e.g., equation (1).

The noise correction coefficient multiplication unit 212 multiplies the noise estimated value V output from the noise estimated value calculation unit 211 by the noise correction coefficient Zn output from the noise correction coefficient setting unit 207 and outputs the product as a corrected noise estimated value. If the maximum path timing does not match the preceding maximum path timing, the noise correction control unit 208 searches for a path having a large power value in both the preceding and current maximum path timings and uses paths other than the maximum path to generate the phase difference vector.

As described above, according to this embodiment, the phase difference vector between the preceding channel estimated value and the current channel estimated value is obtained. A noise correction coefficient corresponding to the phase difference vector is set. The noise estimated value is corrected by multiplying it by the noise correction coefficient. This allows to correct degradation in the noise estimated value under the fading environment upon high-speed movement of the radio receiver by using a simple arrangement. In this embodiment, the noise correction coefficient is selected from values mapped in advance. That is, the noise correction coefficient can be set by calculation in a small amount without using a trigonometric function on the basis of the complex conjugate and the result of multiplication and I. Q division (tan). This prevents degradation in the noise estimated value by calculation in a small amount.

Third Embodiment

The third embodiment of the present invention will be described next. This embodiment shows a detailed example in which the channel estimated value correction apparatus and noise estimated value correction apparatus of the first embodiment or the noise estimated value correction apparatus of the second embodiment is applied to a mobile wireless communication system of, e.g., CDMA.

Figure 6:
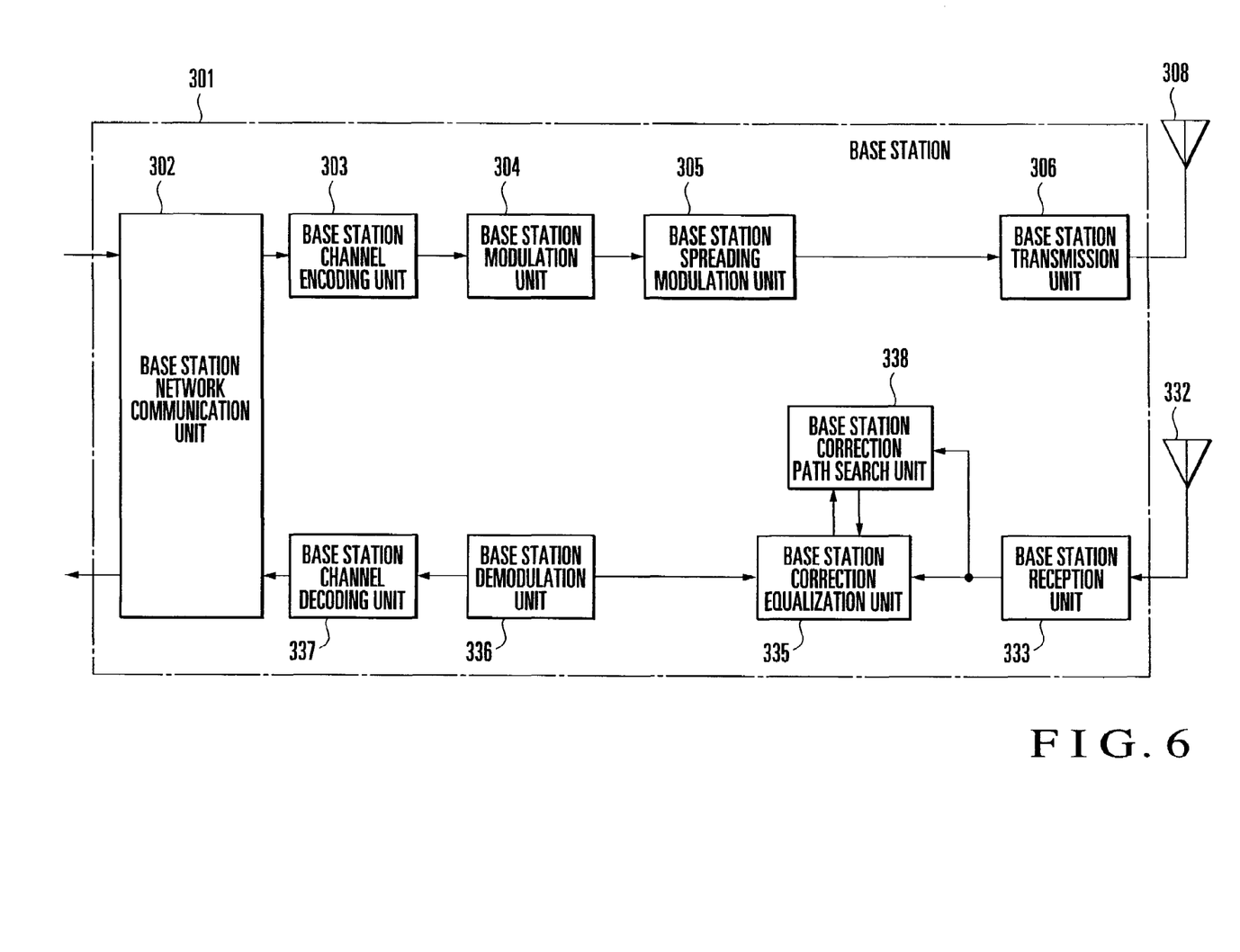
FIG. 6 is a block diagram showing the arrangement of the base station of a mobile wireless communication system according to the third embodiment of the present invention.

A base station 301 comprises a base station network communication unit 302, base station channel encoding unit 303, base station modulation unit 304, base station spreading modulation unit 305, base station transmission unit 306, base station transmission antenna 308, base station reception antenna 332, base station reception unit 333, base station correction path search unit 338, base station correction equalization unit 335, base station demodulation unit 336, and base station channel decoding unit 337.

Figure 7:
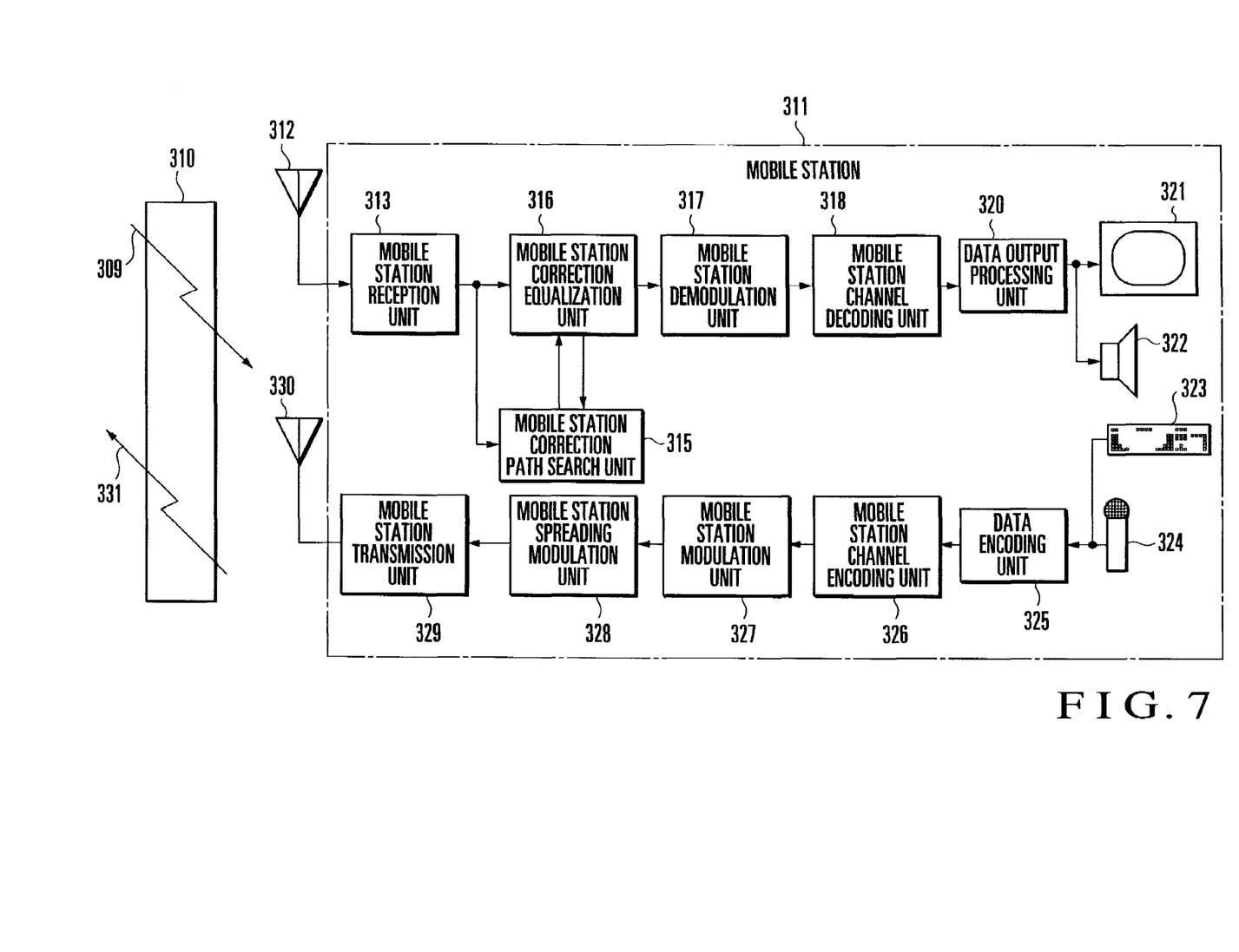
FIG. 7 is a block diagram showing the arrangement of the mobile station of the mobile wireless communication system according to the third embodiment of the present invention.

A mobile station 311 comprises a mobile station reception antenna 312, mobile station reception unit 313, mobile station correction path search unit 315, mobile station correction equalization unit 316, mobile station demodulation unit 317, mobile station channel decoding unit 318, data output processing unit 320, external output devices 321 and 322, external input devices 323 and 324, data encoding unit 325, mobile station channel encoding unit 326, mobile station modulation unit 327, mobile station spreading modulation unit 328, mobile station transmission unit 329, and mobile station transmission antenna 330. Referring to FIG. 7, reference numeral 309 denotes a downlink transmission wave; 310, a transmission channel; and 331, an uplink transmission wave.

The operation of the mobile wireless communication system according to this embodiment will be described below. Referring to FIG. 6, the network communication unit 302 of the base station 301 receives, from a network (not shown), a signal to be sent to the mobile station 311.

The base station channel encoding unit 303 channel-encodes the signal received from the network via the network communication unit 302.

The base station modulation unit 304 modulates the signal channel-encoded by the base station channel encoding unit 303 by using a modulation scheme such as QPSK (Quadrature Phase Shift Keying) or 16QAM (Quadrature Amplitude Modulation).

The base station spreading modulation unit 305 spreads and modulates the signal modulated by the base station modulation unit 304. The base station transmission unit 306 transmits the spread and modulated signal from the base station transmission antenna 308 as the downlink transmission wave 309. The downlink transmission wave 309 is influenced by the transmission channel 310.

Referring to FIG. 7, the mobile station reception antenna 312 of the mobile station 311 receives the downlink transmission wave 309. The mobile station reception unit 313 outputs the received signal.

The mobile station correction path search unit 315 generates a power delay profile on the basis of the received signal output from the mobile station reception unit 313 by using a known pilot pattern and outputs path timing information. The path timing information is updated at a predetermined period.

The mobile station correction equalization unit 316 executes channel estimation on the basis of the received signal output from the mobile station reception unit 313 and the path timing information output from the mobile station correction path search unit 315, obtains a noise correction coefficient Z from the preceding channel estimated value of one period ago and the current channel estimated value, and outputs the noise correction coefficient Z to the mobile station correction path search unit 315 ($Z=Zn=1/Zc$).

The operation of the mobile station correction path search unit 315 will be described with reference to FIG. 8. The mobile station correction path search unit 315 detects, from the power delay profile shown in FIG. 8, L paths at maximum, for which the power degradation amount from a first path $P_1$ where the received power is maximized is smaller than an allowable power degradation amount XdB, and the received power exceeds a predetermined threshold value, and outputs the timing information of each detected path. A conventional path search method detects a path by using noise power Y as the threshold value. In the example shown in FIG. 8, only the first path $P_1$ and second path $P_2$ are detected. In this embodiment, however, a path is detected by using Y×Z, i.e., the noise power Y multiplied by the noise correction coefficient Z as the threshold value. This makes it possible to detect a third path $P_3$ that is invalid in detection using the threshold value containing only the noise power Y. Hence, the paths can effectively be used.

The mobile station correction equalization unit 316 generates a channel matrix by executing channel estimation on the basis of the path timing information from the mobile station correction path search unit 315, executes equalization weight calculation to equalize the received signal output from the mobile station reception unit 313, thereby eliminating the effect of the transmission channel 310, as will be described later.

The mobile station demodulation unit 317 despreads the received signal output from the mobile station correction equalization unit 316 and demodulates the despread signal by a modulation scheme such as QPSK or 16QAM.

The mobile station channel decoding unit 318 decodes the signal demodulated by the mobile station demodulation unit 317. The data output processing unit 320 executes image processing and audio processing for the signal decoded by the mobile station channel decoding unit 318. The data output processing unit 320 outputs an image signal to the external output device 321, i.e., a display device such as an LCD and an audio signal to the external output device 322, i.e., an audio output device such as a loudspeaker.

On the other hand, the data encoding unit 325 of the mobile station 311 executes audio encoding and image processing for an input signal from the external input device 323 such as a key switch and an audio signal from the external input device 324 such as a microphone.

The mobile station channel encoding unit 326 channel-encodes the signal processed by the data encoding unit 325.

The mobile station modulation unit 327 modulates the signal channel-encoded by the mobile station channel encoding unit 326 by a modulation scheme such as QPSK or 16QAM.

The mobile station spreading modulation unit 328 spreads and modulates the signal modulated by the mobile station modulation unit 327. The mobile station transmission unit 329 transmits the spread and modulated signal for the mobile station transmission antenna 330 as the uplink transmission wave 331. The uplink transmission wave 331 is influenced by the transmission channel 310.

Referring to FIG. 6, the base station reception antenna 332 of the base station 301 receives the uplink transmission wave 331. The base station reception unit 333 outputs the received signal.

The base station correction path search unit 338 generates a power delay profile on the basis of the received signal output from the base station reception unit 333 by using a known pilot pattern and outputs path timing information. The path timing information is updated at a predetermined period.

The base station correction equalization unit 335 executes channel estimation on the basis of the received signal output from the base station reception unit 333 and the path timing information output from the base station correction path search unit 338, obtains the noise correction coefficient Z from the preceding channel estimated value of one period ago and the current channel estimated value, and outputs the noise correction coefficient Z ($Z=Zn=1/Zc$).

Figure 8:
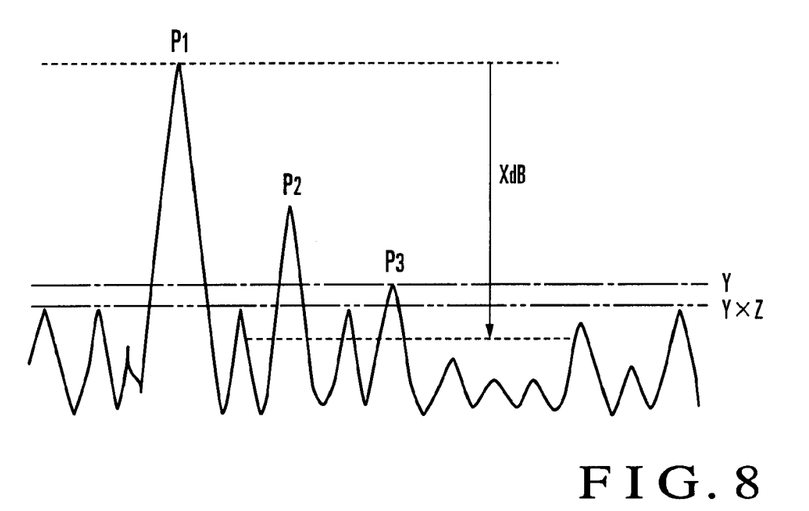
FIG. 8 is a view for explaining the operation of the mobile station correction path search unit of the mobile station.

The base station correction path search unit 338 detects, from the power delay profile shown in FIG. 8, L paths at maximum, for which the power degradation amount from the first path $P_1$ where the received power is maximized is smaller than the allowable power degradation amount XdB, and the received power exceeds the threshold value Y×Z, and outputs the timing information of each detected path.

The base station correction equalization unit 335 generates a channel matrix by executing channel estimation on the basis of the path timing information from the base station correction path search unit 338, and executes equalization weight calculation to equalize the received signal output from the base station reception unit 333, thereby eliminating the effect of the transmission channel 310, as will be described later.

The base station demodulation unit 336 despreads the received signal output from the base station correction equalization unit 335 and demodulates the despread signal by a modulation scheme such as QPSK or 16QAM.

The base station channel decoding unit 337 channel-decodes the signal demodulated by the base station demodulation unit 336. The network communication unit 302 transmits the signal decoded by the base station channel decoding unit 337 to the network.

Figure 9:
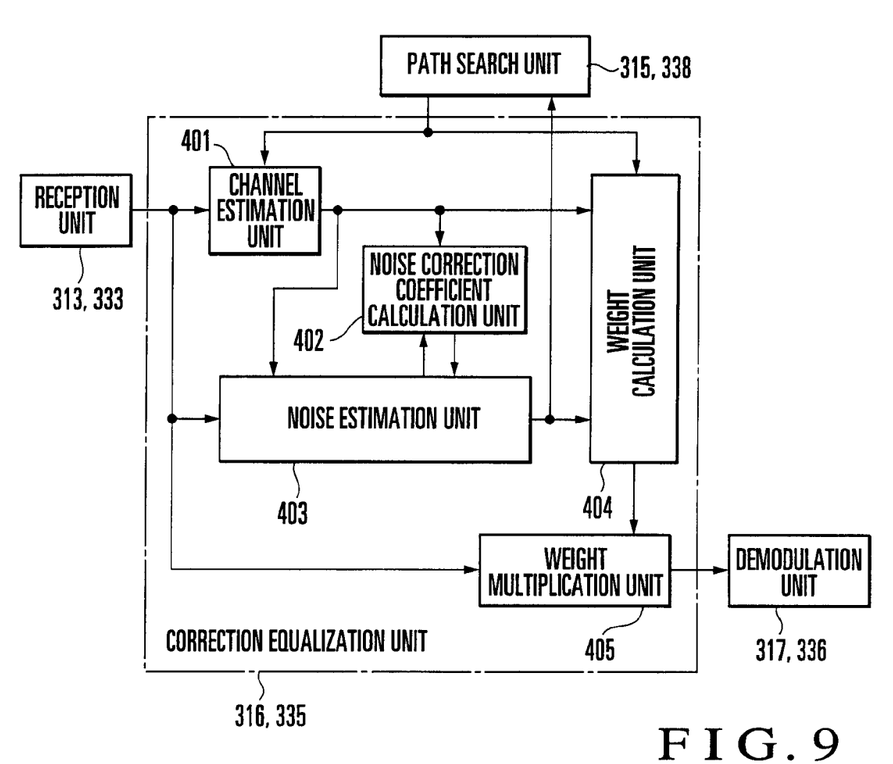
FIG. 9 is a block diagram showing an arrangement example of a mobile station correction equalization unit or base station correction equalization unit.

An arrangement of the mobile station correction equalization unit 316 and base station correction equalization unit 335 will be described next with reference to FIG. 9. FIG. 9 shows an example using the noise estimated value correction apparatus of the second embodiment. Each of the mobile station correction equalization unit 316 and base station correction equalization unit 335 includes an MMSE (Minimum Mean Square Error) equalizer.

Like the channel estimation unit 203 of the second embodiment, a channel estimation unit 401 of the mobile station correction equalization unit 316 or base station correction equalization unit 335 multiplies a pilot symbol contained in a received signal output from the reception unit (mobile station reception unit 313 or base station reception unit 333) by a complex conjugate or despreads the pilot symbol by using a known pilot signal in accordance with path timing information output from the path search unit (mobile station correction path search unit 315 or base station correction path search unit 338) and updated at a predetermined period and averages the pilot symbols obtained by complex conjugate multiplication or despread, thereby outputting a channel estimated value at a predetermined period.

Like the noise correction coefficient calculation unit 204 of the second embodiment, a noise correction coefficient calculation unit 402 obtains a noise correction coefficient from the channel estimated value.

Like the noise estimation unit 205 of the second embodiment, a noise estimation unit 403 obtains a corrected noise estimated value V' by correcting a noise estimated value V on the basis of the received signal output from the reception unit, the channel estimated value output from the channel estimation unit 401, and the noise correction coefficient output from the noise correction coefficient calculation unit 402.

Figure 10:
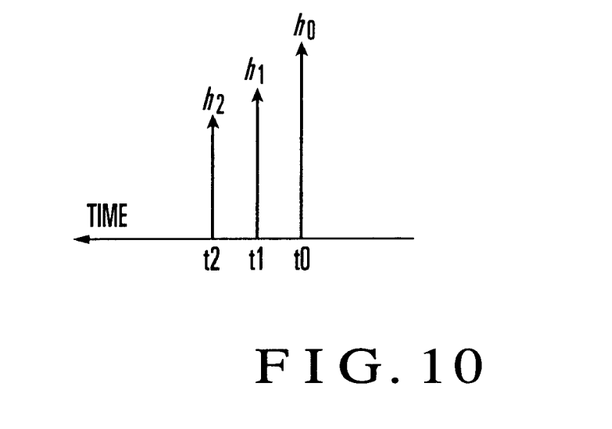
FIG. 10 is a view for explaining the operation of a weight calculation unit in the mobile station correction equalization unit or base station correction equalization unit in FIG. 9.
Figure 11:
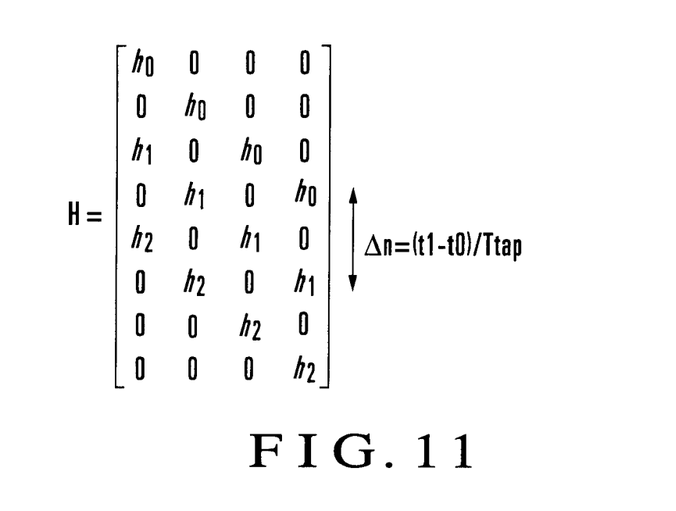
FIG. 11 is a view showing the arrangement of a channel matrix used by the weight calculation unit in the mobile station correction equalization unit or base station correction equalization unit in FIG. 9.

Referring to FIG. 10, a weight calculation unit 404 calculates a weight matrix by using path timings t0, t1, and t2 detected by the path search unit, channel estimated values $h_0$, $h_1$, and $h_2$ output from the channel estimation unit 401, and the corrected noise estimated value V7 output from the noise estimation unit 403. When a chip equalizer is employed as a component of the mobile station correction equalization unit 316 or base station correction equalization unit 335, a channel matrix H is arranged as shown in FIG. 11. Ttap in FIG. 11 indicates one tap interval of the chip equalization filter. The weight calculation unit 404 calculates a weight matrix W by $$W = (H^H H + V'I)^{-1} H^H \qquad (8)$$

where I is the unit matrix.

When a chip equalizer is employed as a component of the mobile station correction equalization unit 316 or base station correction equalization unit 335, a weight multiplication unit 405 includes, e.g., an FIR filter. The weight multiplication unit 405 multiplies the received signal output from the reception unit by the weight matrix W calculated by the weight calculation unit 404 to equalize the received signal, thereby eliminating degradation by the transmission channel. The weight multiplication unit 405 outputs the equalized received signal to the demodulation unit (mobile station demodulation unit 317 or base station demodulation unit 336).

The above-described arrangement implements the mobile station correction equalization unit 316 or base station correction equalization unit 335.

Figure 12:
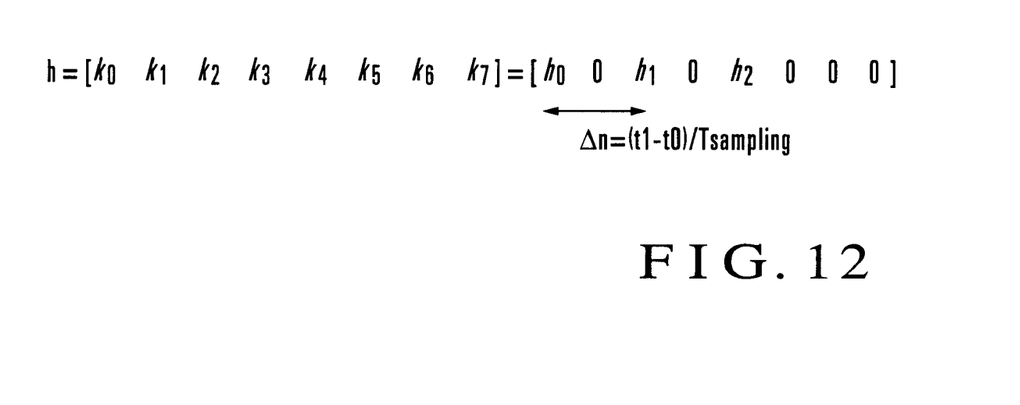
FIG. 12 is a view showing the arrangement of channel estimated values by the weight calculation unit in the mobile station correction equalization unit or base station correction equalization unit in FIG. 9.

When a frequency equalizer is employed as a component of the mobile station correction equalization unit 316 or base station correction equalization unit 335, the weight calculation unit 404 arranges channel estimated values as shown in FIG. 12 by using the detected path timings t0, t1, and t2. Tsampling in FIG. 12 indicates a data sampling interval. The weight calculation unit 404 calculates a weight matrix Wn by executing FFT (Fast Fourier Transform) for the vector of each channel estimated value shown in FIG. 12 in accordance with $$Wn = \frac{Fkn*}{|Fkn|^2 + V'} \qquad (9)$$

where Fkn is a channel estimated value kn after FFT, and Fkn* is the complex conjugate of the channel estimated value Fkn.

When a frequency equalizer is employed as a component of the mobile station correction equalization unit 316 or base station correction equalization unit 335, the weight multiplication unit 405 executes FFT of the received signal output from the reception unit, multiplies the received signal after FFT by the weight matrix Wn, and executes IFFT (Inverse Fast Fourier Transform) to equalize the received signal, thereby eliminating degradation by the transmission channel. The weight multiplication unit 405 outputs the equalized received signal to the demodulation unit.

Figure 13:
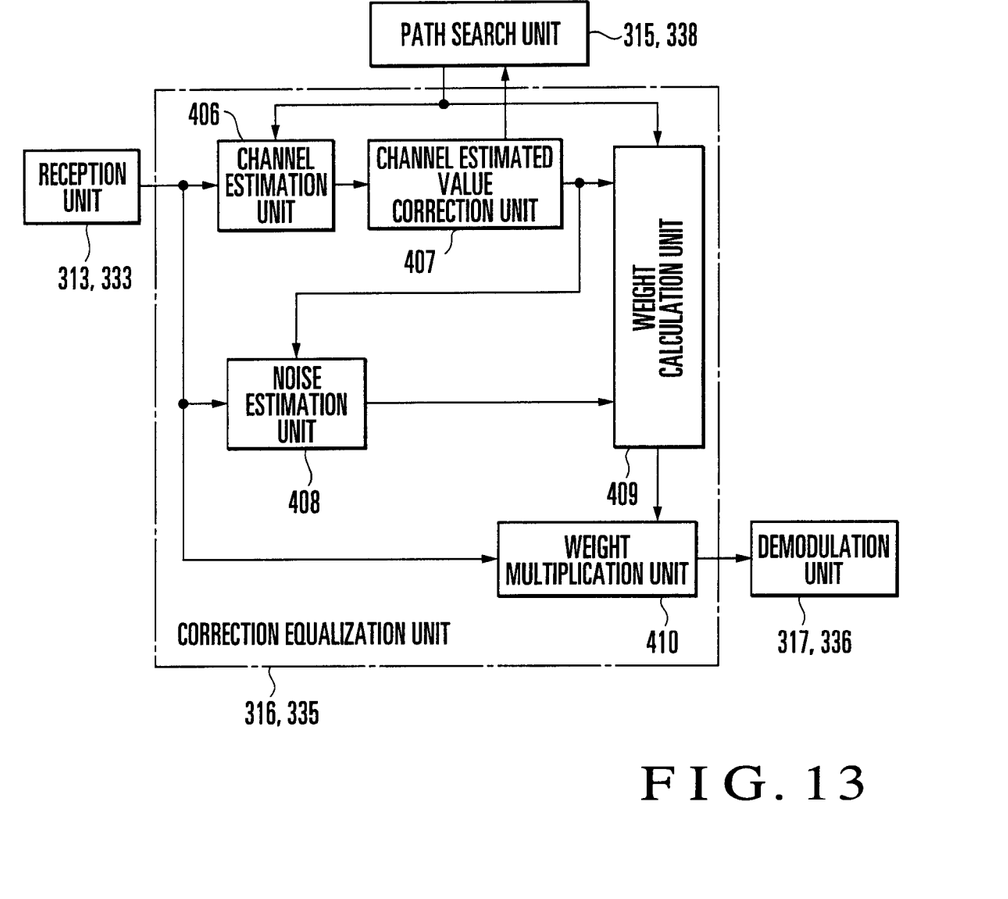
FIG. 13 is a block diagram showing another arrangement example of the mobile station correction equalization unit or base station correction equalization unit.

Another arrangement example of the mobile station correction equalization unit 316 or base station correction equalization unit 335 will be described next with reference to FIG. 13. FIG. 13 shows an example using the noise estimated value correction apparatus of the first embodiment.

Like the channel estimation unit 401, a channel estimation unit 406 outputs a channel estimated value at a predetermined period.

A channel estimated value correction unit 407 operates like the channel estimated value correction unit 104 of the first embodiment and outputs a corrected channel estimated value.

Like the noise estimation unit 105 of the first embodiment, a noise estimation unit 408 obtains the corrected noise estimated value V' from the received signal and corrected channel estimated value.

A weight calculation unit 409 calculates a weight matrix, like the weight calculation unit 404 in FIG. 9. In this case, however, the corrected channel estimated value output from the channel estimated value correction unit 407 is used in place of the channel estimated value output from the channel estimation unit 406. The corrected noise estimated value V' output from the noise estimation unit 408 is used in place of the corrected noise estimated value V' output from the noise estimation unit 403. The operation of a weight multiplication unit 410 is the same as that of the weight multiplication unit 405.

This implements the mobile station correction equalization unit 316 or base station correction equalization unit 335.

In this embodiment, the first and second embodiments are applied to the equalization unit and path search unit. The corrected noise estimated value or corrected channel estimated value may be used to control transmission power or reception power between the base station and the mobile station or between mobile stations. A detailed arrangement of the power control means provided in the mobile station or base station is disclosed in, e.g., reference 5.

As described above, according to the present invention, the phase difference vector between the preceding channel estimated value and the current channel estimated value is obtained. A correction coefficient corresponding to the phase difference vector is set. A corrected noise estimated value is obtained by correcting the noise estimated value on the basis of the received signal and correction coefficient. More specifically, a channel correction coefficient corresponding to the phase difference vector is set. The channel estimated value is corrected by multiplying it by the channel correction coefficient. The noise estimated value is corrected by using a thus obtained corrected channel estimated value. Alternatively, a noise correction coefficient corresponding to the phase difference vector is set. The noise estimated value is corrected by multiplying it by the noise correction coefficient.

This allows to correct degradation in the noise estimated value under the fading environment upon high-speed movement of the radio receiver. As a result, it is possible to prevent degradation in the characteristic using the signal-to-noise ratio or the signal-to-noise ratio and interference power ratio, and for example, degradation in the equalization characteristic of an equalizer, degradation in the path assignment characteristic of path search, or degradation in the power control characteristic by calculation in a small amount and a simple arrangement.

In the present invention, the corrected noise estimated value and channel estimated value, or the corrected channel estimated value and corrected noise estimated value are used for weight calculation of the MMSE equalizer. It is therefore possible to prevent degradation in the equalization characteristic of the correction equalization unit by calculation in a small amount and a simple arrangement.

In the present invention, the criterion of path detection is set on the basis of the noise power and noise correction coefficient. It is therefore possible to prevent degradation in the path assignment characteristic of the path search unit by calculation in a small amount and a simple arrangement.

In the present invention, the corrected noise estimated value or corrected channel estimated value is used to control power between the radio receiver and another radio receiver. It is therefore possible to prevent degradation in the control characteristic by calculation in a small amount and a simple arrangement.

In the present invention, when one of the two, preceding and current channel estimated values used to generate the phase difference vector is smaller than the threshold value based on the noise estimated value, the channel correction coefficient is invalidated. It is therefore possible to correct the noise estimated value by using only a valid channel correction coefficient.

In the present invention, when one of the two, preceding and current channel estimated values used to generate the phase difference vector is smaller than the threshold value based on the noise estimated value, the noise correction coefficient is invalidated. It is therefore possible to correct the noise estimated value by using only a valid noise correction coefficient.

The present invention is applicable a radio receiver of, e.g. CDMA.

What is claimed is:

1. A radio receiver comprising:
   a channel estimation unit which obtains a channel estimated value from a received signal at a predetermined period by using a known pilot signal;
   a phase difference vector generation unit which obtains a phase difference vector between a channel estimated value precedingly output from said channel estimation unit and a channel estimated value currently output from said channel estimation unit;
   a correction coefficient setting unit which sets a correction coefficient corresponding to the phase difference vector output from said phase difference vector generation unit; and
   a noise estimation unit which obtains a corrected noise estimated value by correcting a noise estimated value on the basis of the received signal and the correction coefficient output from said correction coefficient setting unit and outputs the corrected noise estimated value.

2. A receiver according to claim 1, wherein
   said correction coefficient setting unit comprises a channel correction coefficient setting unit which sets a channel correction coefficient corresponding to the phase difference vector,
   the receiver further comprises a channel correction coefficient multiplication unit which multiplies the channel estimated value output from said channel estimation unit by the channel correction coefficient output from said channel correction coefficient setting unit to correct the channel estimated value and outputs a corrected channel estimated value, and
   said noise estimation unit obtains the corrected noise estimated value by using the corrected channel estimated value corrected by the channel correction coefficient.

3. A receiver according to claim 2, wherein said channel correction coefficient setting unit sets, as the channel correction coefficient, a reciprocal of a power degradation amount corresponding to a phase swinging amount of a pilot signal contained in the received signal, the phase swinging amount being equivalent to an angle of the phase difference vector.

4. A receiver according to claim 2, further comprising a correction equalization unit which equalizes the received signal, said correction equalization unit comprising a weight calculation unit which calculates a weight of an MMSE equalizer by using the corrected channel estimated value and the corrected noise estimated value, and a weight multiplication unit which multiplies the received signal by the weight output from said weight calculation unit to equalize the received signal.

5. A receiver according to claim 2, further comprising power control means for executing power control between the radio receiver and another radio receiver by using one of the corrected channel estimated value output from said channel correction coefficient multiplication unit and the corrected noise estimated value output from said noise estimation unit.

6. A receiver according to claim 1, wherein
   said correction coefficient setting unit comprises a noise correction coefficient setting unit which sets a noise correction coefficient corresponding to the phase difference vector, and
   said noise estimation unit comprises
   a noise estimated value calculation unit which obtains the noise estimated value from the received signal, and
   a noise correction coefficient multiplication unit which multiplies the noise estimated value output from said noise estimated value calculation unit by the noise correction coefficient output from said noise correction coefficient setting unit to obtain the corrected noise estimated value.

7. A receiver according to claim 6, wherein said noise correction coefficient setting unit sets, as the correction coefficient, a power degradation amount corresponding to a phase swinging amount of a pilot signal contained in the received signal, the phase swinging amount being equivalent to an angle of the phase difference vector.

8. A receiver according to claim 6, further comprising a correction equalization unit which equalizes the received signal, said correction equalization unit comprising a weight calculation unit which calculates a weight of an MMSE equalizer by using the corrected noise estimated value and the channel estimated value, and a weight multiplication unit which multiplies the received signal by the weight output from said weight calculation unit to equalize the received signal.

9. A receiver according to claim 6, further comprising power control means for executing power control between the radio receiver and another radio receiver by using the corrected noise estimated value output from said noise estimation unit.

10. A receiver according to claim 1, wherein said correction coefficient setting unit selects, from correction coefficients stored in advance, a correction coefficient corresponding to a value of a tangent of the phase difference vector output from said phase difference vector generation unit.

11. A receiver according to claim 1, further comprising a correction control unit which invalidates the correction coefficient set by said correction coefficient setting unit when one of the preceding current channel estimated value and the current channel estimated value used to generate the phase difference vector is smaller than a threshold value based on the noise estimated value.

12. A receiver according to claim 1, further comprising a path search unit which detects a path by using the received signal and the known pilot signal while setting, as a criterion, the corrected noise estimated value output from said noise estimation unit.

13. A noise estimated value correction method comprising the steps of:
 obtaining a channel estimated value from a received signal at a predetermined period by using a known pilot signal;
 obtaining a phase difference vector between a precedingly obtained channel estimated value and a currently obtained channel estimated value;
 setting a correction coefficient corresponding to the phase difference vector; and
 obtaining a corrected noise estimated value by correcting a noise estimated value on the basis of the received signal and the correction coefficient.

14. A method according to claim 13, wherein
 in the setting step, a channel correction coefficient corresponding to the phase difference vector is set,
 the method further comprises the step of multiplying the channel estimated value by the channel correction coefficient to correct the channel estimated value and outputting a corrected channel estimated value, and
 in the corrected noise estimated value obtaining step, the corrected noise estimated value is obtained by using the corrected channel estimated value corrected by the channel correction coefficient.

15. A method according to claim 13, wherein
 in the setting step, a noise correction coefficient corresponding to the phase difference vector is set, and
 the corrected noise estimated value obtaining step comprises the steps of
 obtaining the noise estimated value from the received signal, and
 multiplying the noise estimated value by the noise correction coefficient to obtain the corrected noise estimated value.

* * * * *